No. 613,572. Patented Nov. 1, 1898.
M. E. HUNT.
MEAT TENDERER.
(Application filed Nov. 6, 1897.)
(No Model.)
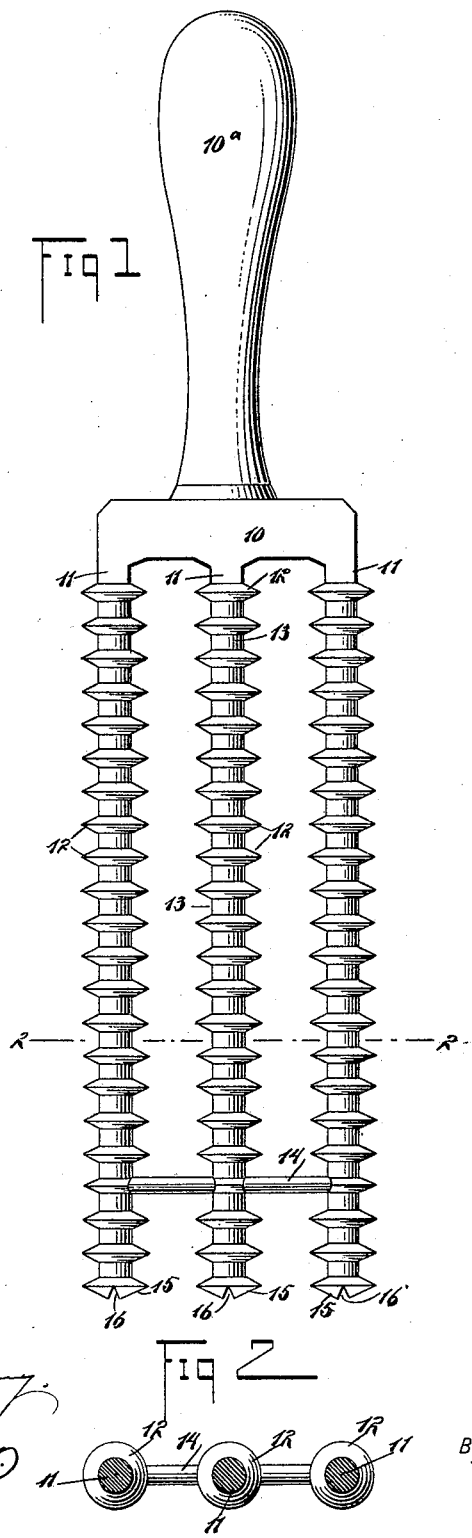
WITNESSES
INVENTOR
M. E. Hunt.
BY
ATTORNEYS.

UNITED STATES PATENT OFFICE.

MARSHALL E. HUNT, OF BELLE PLAIN, IOWA, ASSIGNOR OF ONE-HALF TO GEORGE L. THAYER, OF SAME PLACE.

MEAT-TENDERER.

SPECIFICATION forming part of Letters Patent No. 613,572, dated November 1, 1898.

Application filed November 6, 1897. Serial No. 657,681. (No model.)

*To all whom it may concern:*

Be it known that I, MARSHALL E. HUNT, of Belle Plain, in the county of Benton and State of Iowa, have invented a new and Improved Meat-Tenderer, of which the following is a full, clear, and exact description.

The object of my invention is to provide a simple form of device particularly adapted for beating meat for the purpose of rendering the same more tender.

Another object of the invention is to so construct the meat-tenderer that it may be used in various ways, and particularly so that it will cover a large surface or may be brought to act upon the flesh close to the bone, the action of the tenderer being both to cut and to bruise the meat and yet not mutilate it beyond the necessary degree to render it tender.

Another object of the invention is to so construct the meat-tenderer that it will be exceedingly simple, economic, and capable of being readily cleaned.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1 is a plan view of the improved device, and Fig. 2 is a transverse section on the line 2 2 of Fig. 1.

The device consists of a rear cross or body bar 10, to which a handle 10ª is secured in any suitable or approved manner. From the body-bar 10 a series of fingers 11 is projected, the fingers being of any desired length and in any desired number, while preferably the fingers are in parallel arrangement. Each finger is provided with a series of annular projections 12, the projections being beveled from the center in opposite directions to present cutting edges, although the cross-sectional shape of the projections may be varied if found desirable. Usually the annular projections 12 are arranged alike on all of the fingers, and while the spaces 13 between the projections are shown circular in cross-section the said spaces may be polygonal or angular if found desirable.

In order that the fingers shall not spring to too great an extent and, furthermore, in order to strengthen the fingers, a tie-bar 14 is passed from the outer fingers through the intermediate fingers, near the free ends of said fingers, as shown particularly in Fig. 1; also, preferably each finger is made to terminate in one or more, usually two, inclined sharp or cutting surfaces 15, and when two of these surfaces are employed they are divided by a space 16, as is also shown in Fig. 1. The device may be used with either flat side uppermost, or it may be used edgewise, or the end surfaces 15 may be brought into requisition, so that the plain surfaces of the meat may be readily acted upon and the surfaces next to the bone equally well treated.

Having thus described my invention, I claim as new and desire to secure by Letters Patent—

A meat-tenderer having a handle, a body-bar attached rigidly thereto and extending transversely with reference to the handle, and a plurality of fingers projecting transversely with reference to the handle-bar and supported rigidly thereon, the fingers being extended parallel with each other from the side of the body-bar opposite the handle, and being each provided with a series of annular projections spaced apart so that the annular projections will cut into the meat and so that the fingers will engage the meat at points between the projections to bruise the meat.

MARSHALL E. HUNT.

Witnesses:
MILTON J. ATHEY,
J. C. MILNER.